(12) United States Patent
Narasimha et al.

(10) Patent No.: US 8,699,645 B2
(45) Date of Patent: Apr. 15, 2014

(54) METHOD AND APPARATUS FOR A ROBUST FRACTIONALLY SPACED EQUALIZER

(75) Inventors: Madihally J. Narasimha, Santa Clara, CA (US); Dineshkumar Karuppanna Gounder Ramasamy, Goleta, CA (US); Je Woo Kim, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/458,514

(22) Filed: Apr. 27, 2012

(65) Prior Publication Data

US 2013/0177065 A1    Jul. 11, 2013

Related U.S. Application Data

(60) Provisional application No. 61/584,904, filed on Jan. 10, 2012.

(51) Int. Cl.
 *H04B 1/10* (2006.01)
 *H03H 7/30* (2006.01)
(52) U.S. Cl.
 USPC .......................................... 375/350; 375/234
(58) Field of Classification Search
 USPC .......................................... 375/350, 346, 316
 See application file for complete search history.

(56) References Cited

U.S. PATENT DOCUMENTS

| 2007/0110200 | A1* | 5/2007 | Mergen et al. ............... 375/350 |
| 2007/0121717 | A1  | 5/2007 | Dong et al. |
| 2008/0075159 | A1  | 3/2008 | Sontowski et al. |
| 2009/0225823 | A1  | 9/2009 | Chen et al. |
| 2010/0142596 | A1* | 6/2010 | Kang et al. .................... 375/149 |
| 2011/0033009 | A1* | 2/2011 | Betts ............................. 375/295 |
| 2011/0090946 | A1* | 4/2011 | Mergen et al. ............... 375/232 |

OTHER PUBLICATIONS

International Search Report and Written Opinion—PCT/US2013/021068—ISA/EPO—May 2, 2013.

* cited by examiner

*Primary Examiner* — Chieh M Fan
*Assistant Examiner* — Brian J Stevens
(74) *Attorney, Agent, or Firm* — Darren M. Simon (57) ABSTRACT

The described aspects include a user equipment (UE) apparatus and corresponding method of equalizing samples of received signals in wireless communication. A plurality of samples of a signal received in wireless communication can be obtained, and on-time samples and late samples of the plurality of samples are independently equalized to respectively generate equalized on-time samples and equalized late samples. In addition, a preference factor can be applied to at least the equalized on-time samples to generate preferred equalized on-time samples, which are combined with the equalized late samples to generate a set of equalized samples for decoding.

16 Claims, 10 Drawing Sheets

METHOD AND APPARATUS FOR A ROBUST FRACTIONALLY SPACED EQUALIZER

CLAIM OF PRIORITY UNDER 35 U.S.C. §119

The present Application for Patent claims priority to Provisional Application No. 61/584,904, entitled "METHOD AND APPARATUS FOR A ROBUST FRACTIONALLY SPACED EQUALIZER," filed Jan. 10, 2012, assigned to the assignee hereof and hereby expressly incorporated by reference herein.

BACKGROUND

1. Field

Aspects of the present disclosure relate generally to wireless communication systems, and more particularly, to decoding wireless communications.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA) and similar derivatives, which provide higher data transfer speeds and capacity to associated UMTS networks.

User equipment (UE) in some wireless systems can employ adaptive chip-rate equalizers (EQ) to improve high speed data throughput performance. T-spaced equalizers (also referred to as cx1 EQ), for example, operate on "chip-rate-one" receive samples. Using a circulant approximation of covariance matrix, the cx1 EQ weights (also known as the tap coefficients or tap weights) are often computed in the frequency domain by dividing the Discrete Fourier Transform (DFT) of the channel impulse response (CIR) by the DFT of the covariance of the received samples. Although the estimated CIR and covariance values are corrupted by measurement noise, this division operation does not pose significant ill-conditioning issues (such as division by zero) due to the inherent aliasing components present in the cx1 samples.

The cx1 EQ performance is sensitive to the phase of the cx1 sampling clock, and selection of the optimum sampling phase in a fading channel scenario can often be impractical. Hence, one version of a cx1 EQ, referred to as a branch select cx1 EQ, can select one of two sampling phases, spaced at half of a chip distance (on-time or late), based on the corresponding CIR energies to obtain a sub-optimum cx1 EQ output. A UE can use another EQ, such as a (T/2)-fractionally spaced equalizer (also referred to as a cx2 EQ), which uses a front-end root-raised-cosine (RRC) filter to obtain a chip estimate from on-time and late branches. A cx1 EQ may nevertheless exhibit inferior performance to a cx2 EQ because the cx2 rate satisfies the Nyquist criterion for reconstructing band-limited signals. Computation of the cx2 tap coefficients based on the optimum minimum mean square error (MMSE) criterion, however, can lead to ill-conditioning issues due to the combined effects of the measurement noise mentioned above and the band limiting caused by the front-end RRC filter.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with providing a robust fractionally spaced equalizer (FSE) that resolves the ill conditioning problem in the computation of the cx2 tap weights. For example, the FSE can use an independent cx1 equalizer (EQ) on each of on-time and late branch sampling phases and can combine the two cx1 equalized outputs with diversity combining techniques; thus, the tap weights are computed independently for each of the two cx1 streams. The FSE applies a preference factor to the two cx1 streams, and combines the results of both the on-time and late branches to obtain the final EQ output. The FSE can compute the preference factors, for example, based in part on the covariance for the respective branch.

In one aspect, a method for equalizing samples of received signals in wireless communication is provided that includes obtaining a plurality of samples of a signal received in wireless communication and independently equalizing on-time samples and late samples of the plurality of samples to respectively generate equalized on-time samples and equalized late samples. The method also includes applying a preference factor computed based on a covariance of the on-time samples to at least the equalized on-time samples to generate preferred equalized on-time samples and combining the preferred equalized on-time samples and the equalized late samples to generate a set of equalized samples for decoding.

In another aspect, an apparatus for equalizing samples of received signals in wireless communication is provided. The apparatus includes means for obtaining a plurality of samples of a signal received in wireless communication and means for independently equalizing on-time samples and late samples of the plurality of samples to respectively generate equalized on-time samples and equalized late samples. The apparatus further includes means for applying a preference factor computed based on a covariance of the on-time samples to at least the equalized on-time samples to generate preferred equalized on-time samples and means for combining the preferred equalized on-time samples and the equalized late samples to generate a set of equalized samples for decoding.

Still another aspect includes a computer program product for equalizing samples of received signals in wireless communication comprising a non-transitory computer-readable medium. The computer-readable medium includes code for causing at least one computer to obtain a plurality of samples of a signal received in wireless communication, code for causing the at least one computer to independently equalize on-time samples and late samples of the plurality of samples to respectively generate equalized on-time samples and equalized late samples, code for causing the at least one computer to apply a preference factor computed based on a covariance of the on-time samples to at least the equalized on-time samples to generate preferred equalized on-time samples, and code for causing the at least one computer to combine the preferred equalized on-time samples and the equalized late samples to generate a set of equalized samples for decoding.

Further, an apparatus for equalizing samples of received signals in wireless communication is provided in another aspect including at least one processor configured to obtain a plurality of samples of a signal received in wireless communication and independently equalize on-time samples and late samples of the plurality of samples to respectively generate equalized on-time samples and equalized late samples. The at least one processor is further configured to apply a preference factor computed based on a covariance of the on-time samples to at least the equalized on-time samples to generate preferred equalized on-time samples and combine the preferred equalized on-time samples and the equalized late samples to generate a set of equalized samples for decoding. The apparatus also has a memory coupled to the at least one processor.

These and other aspects of the disclosure will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Described herein are various aspects related to a robust fractionally spaced equalizer (FSE) that performs independent cx1 equalization on on-time and late branches and combining the two cx1 equalized outputs with diversity combining techniques. In this regard, tap weights are computed independently for the two cx1 streams. This structure can yield a practical cx2 equalizer (EQ) by combining the results of both the on-time and late branches to obtain the final EQ output. In this regard, the ill conditioning problem in the computation of the cx2 tap weights is resolved. Furthermore, two cx1 EQs combined as described herein can yield improved performance over a branch select cx1 EQ. The diversity combining techniques described herein can include selecting preference factors for applying to each branch in combining, where the preference factors can be computed based on a corresponding covariance. Also, described herein, are multiple aspects related to performing simplified and more complex techniques to combine the outputs of the two branches.

Figure 1:
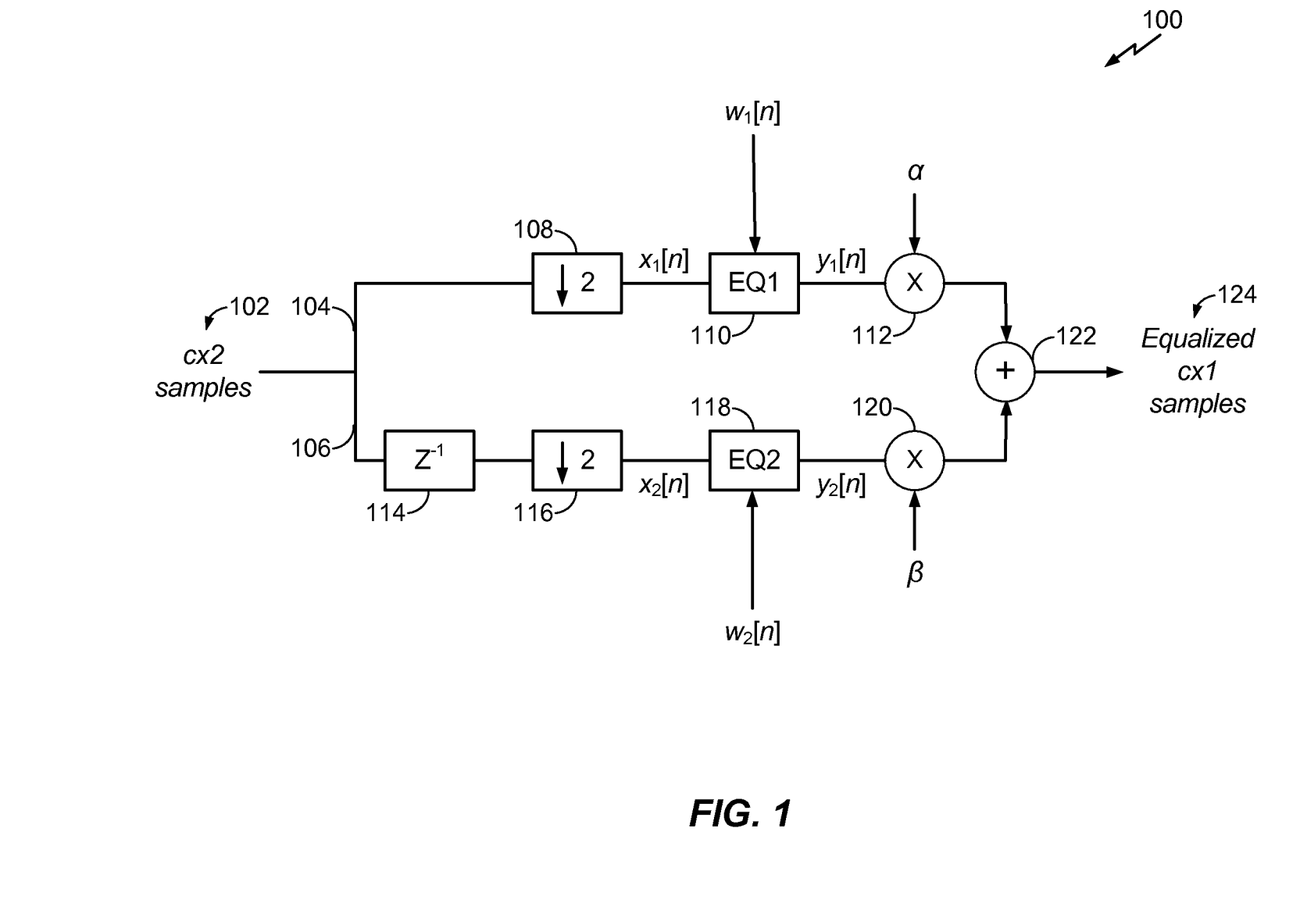
FIG. 1 is an example robust fractionally spaced equalizer (EQ).

FIG. 1 illustrates a block diagram of an example robust FSE 100. FSE 100 can process cx2 samples 102 of signals received in a wireless communication environment. For example, the FSE 100 can obtain the samples from a received signal, from a downconverter that downconverts the samples a signal to a lower frequency for more reliable communication of the samples within a wireless device, etc. FSE 100 can separate on-time and late signal phases of the cx2 samples and independently perform cx1 equalization thereof, which are indicated by respective branches 104 and 106. For example, the cx2 samples can be high speed data samples of the signal that are sampled at a chip rate or a multiple thereof (e.g., twice the chip rate). When evaluated on the on-time signal phase branch 104 (also referred to herein as the on-time branch), FSE 100 can decimate the samples at 108 to the chip rate to produce $x_1[n]$ chip rate received samples. The samples are then equalized by EQ1 110 according to one or more weight factors $w_1[n]$ to produce equalized cx1 samples $y_1[n]$. The equalized cx1 samples are then multiplied by a preference factor, α, at 112, which can be computed based on a comparison of the energy (e.g., CIR, covariance, etc.) of the on-time signal phase and/or the late signal phase of the samples. Covariance in this context refers to the energy over a short duration of N samples (e.g., N is typically 32 to 64) of the received signal. Thus, if $x_1[n], x_1[n-1], \ldots, x_1[n-N+1]$ denote the N most recently received samples for the on-time branch, the corresponding covariance is equal to the sum of the squares of these N samples. The covariance for the late branch is similarly computed considering the $x_2[n]$ received signal. Covariance of the on-time samples can be referred to as the on-time covariance, and covariance of the late samples can be referred to as the late covariance herein. Similarly, CIR of the on-time samples can be referred to as on-time CIR, and CIR of the late samples can be referred to as late CIR. In any case, energy measured over the on-time samples can be referred to as on-time energy and those over late samples as late energy.

FSE 100 can decimate samples evaluated on the late signal phase branch 106 (also referred to herein as the late branch) to a lower sample rate at 116 to produce $x_2[n]$ chip rate received samples after a delay (e.g., a half-chip delay) implemented at 114. The samples are then equalized by EQ2 118 according to one or more weight factors $w_2[n]$ to produce equalized cx1 samples $y_2[n]$. The equalized cx1 samples are then multiplied by a preference factor, β, at 112, which can be computed based on preference factor α, a comparison of the energy or covariance of the on-time signal phase and the late signal phase of the samples, as described. The samples $y_1[n]$ and $y_2[n]$ are combined at 122 to produce equalized cx1 samples 124.

In a specific example, weight factor $w_1[n]$ can be computed in the frequency domain as the Fourier transform of the channel impulse response (CIR) of the on-time phase samples, denoted $h_1[n]$, divided by the Fourier transform of the autocovariance of the on-time phase samples, denoted $R_{11}[n]$. Similarly, $w_2[n]$ can be computed in the frequency domain as the Fourier transform of as $h_2[n]$ (CIR of the late phase samples) divided by the Fourier transform of $R_{22}[n]$.

In addition, the preference factors $\alpha$ and $\beta$ can be computed based on a comparison of the CIR or covariance of the on-time and late phase samples to prefer equalization of one branch 104 or 106 over another by the preference factor. In one example, $\alpha$ can be computed as follows:

$$P_1 = \frac{E_1}{E_1 + E_2}$$

$$\alpha = 0.5 + s(P_1 - 0.5)$$

where $E_1$ is the energy (e.g., CIR or covariance) of the on-time samples, $E_2$ is the energy of the late samples, $P_1$ represents a comparison of the energies, and s is an imbalance weight for specifying an amount to favor the branch with more energy. In an example, $\beta = 1 - \alpha$.

In another example, $$R_{ij}[n] = \sum_k x_i[k] x_j^*[k-n],$$

where $R_{ij}[n]$ is the covariance, $x_i$ and $x_j$ are the on-time and late branch samples (e.g., i,j=1 is the on-time branch and i,j=2 is the late branch), k is a time index, and the preference factors $\alpha$ and $\beta$ can be computed using the following formula:

$$\begin{bmatrix} w_1 \otimes R_{11} \otimes w_1^{mf}[0] & w_1 \otimes R_{12} \otimes w_2^{mf}[0] \\ w_2 \otimes R_{12}^{mf} \otimes w_1^{mf}[0] & w_2 \otimes R_{22} \otimes w_2^{mf}[0] \end{bmatrix} \begin{bmatrix} \alpha \\ \beta \end{bmatrix} = \begin{bmatrix} w_1^{mf} \otimes h_1^{mf}[0] \\ w_2^{mf} \otimes h_2^{mf}[0] \end{bmatrix}$$

where $\otimes$ is the convolution operator, $w_i^{mf}[n]$ is a matched filter, which can be computed by flipping and conjugating the equalizer weight factors (e.g., tap weights) such that $w_i^{mf}[n] = w_i^*[-n]$, and $R_{12}$ is the cross covariance between the on-time and late branches. Moreover, in one example, a device employing the FSE 100 can determine whether to use the FSE 100 or a branch select EQ based on energy (e.g., CIR or covariance) over the on-time and late phase samples. For example, using $P_1$ above, if $P_1 - 0.5 > f$, then use branch select EQ, else use the FSE 100, where f is an imbalance threshold, such as 0.05.

Figure 2:
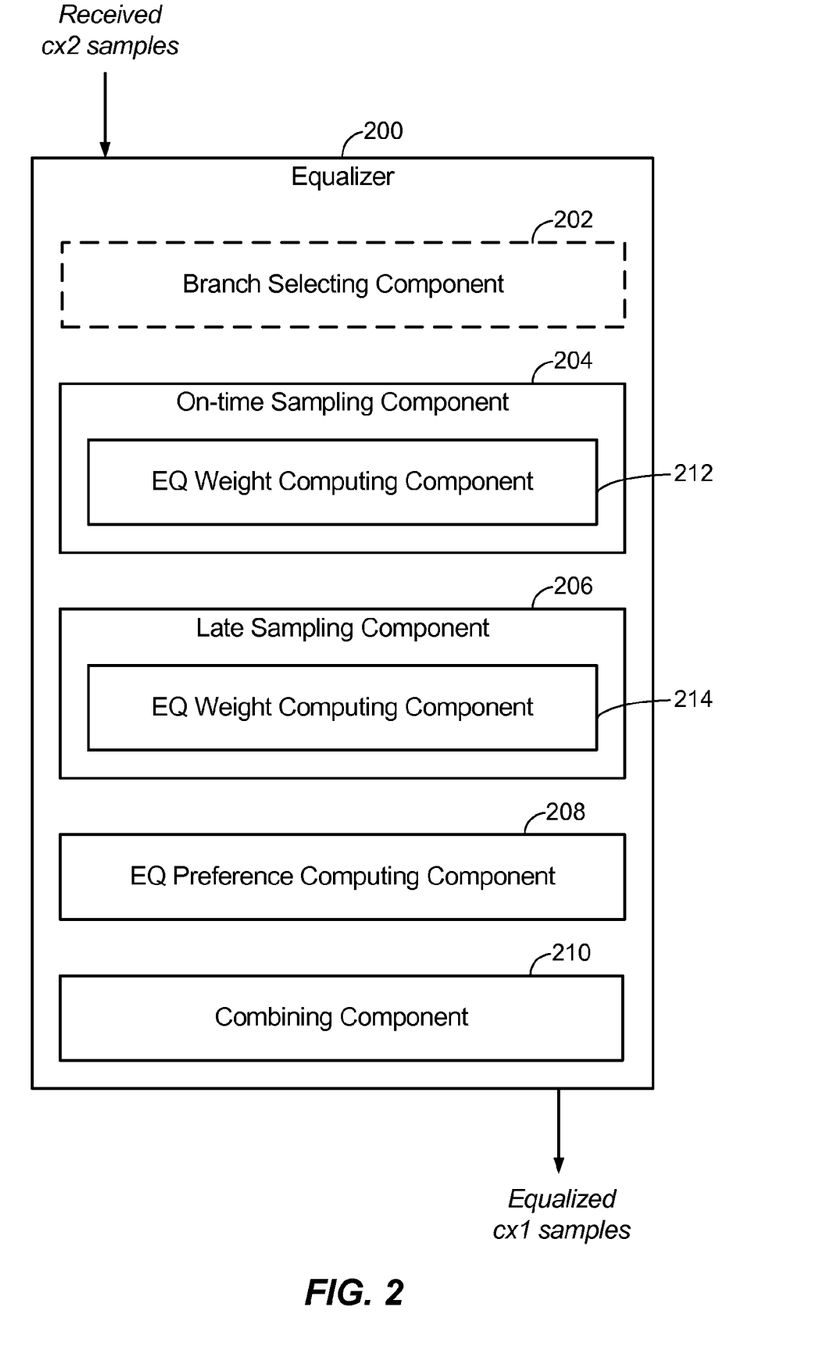
FIG. 2 is an example equalizer for determining whether to perform branch select EQ or robust fractionally spaced EQ functionality.

FIG. 2 illustrates an example EQ 200 that facilitates equalizing samples of a received signal. EQ 200 can be utilized in a receiver of a wireless network. For example, EQ 200 can be employed by a portion of a demodulator, such as a demodulator front-end, to produce equalized signal samples for subsequent decoding (e.g., by a Viterbi or turbo decoder, and/or the like). EQ 200 includes an optional branch selecting component 202 for specifying whether EQ 200 is to operate as a branch select EQ, a robust FSE, etc. EQ 200 also includes an on-time sampling component 204 for equalizing on-time phase samples of a received signal, and a late sampling component 206 for equalizing late samples. EQ 200 also includes a EQ preference computing component 208 for determining preference factors for samples from the on-time sampling component 204 and the late sampling component 206 for applying to the samples, and a combining component 210 for combining the equalized samples of the on-time sampling component 204 and late sampling component 206 with the applied preference factors. On-time sampling component 204 and late sampling component 206 include EQ weight computing components 212 and 214 for determining a weight to apply to the samples to equalize the samples at each branch.

According to an example, EQ 200 can receive high rate data samples for equalizing, as described, and branch selecting component 202 can optionally determine whether to equalize the samples using a branch select EQ functionality or a robust FSE functionality, as described herein. For example, branch selecting component 202 can evaluate a comparison of energy over the received samples, as described, where the energy can include a CIR or covariance. For example, branch selecting component 202 can compute $P_1$ as discussed above, and compare the computed value to a threshold to determine whether to utilize the branch select EQ functionality or the robust FSE functionality.

Where branch selecting component 202 is not present or determines to utilize the robust FSE functionality, on-time sampling component 204 and late sampling component 206 can independently equalize samples of respective branches of the received samples. For example, a portion of received samples can include on-time phase samples and late phase samples from the corresponding signals. In one example, the samples can be in alternating indices of vectors representing the received samples. On-time sampling component 204 can equalize the on-time phase samples while late sampling component 206 equalizes the late phase samples. For example, on-time sampling component 204 and late sampling component 206 can equalize the samples based on respective computed weights.

EQ weight computing components 212 and 214 can similarly determine weights for equalizing the respective branches of the received samples. For example, EQ weight computing component 212 can determine weight factor $w_1[n]$ in the frequency domain as the Fourier transform of the channel impulse response (CIR) measured from the on-time phase samples, denoted $h_1[n]$, divided by the Fourier transform of the covariance of the on-time samples, denoted $R_{11}[n]$. Similarly, EQ weight computing component 214 can determine weight factor $w_2[n]$ in the frequency domain as the Fourier transform of the channel impulse response (CIR) measured from the late phase samples, denoted $h_2[n]$, divided by the Fourier transform of the covariance of the late phase samples, denoted $R_{22}[n]$.

In addition, EQ preference computing component 208 can compute preference factors to apply to the equalized samples, as described above (e.g., based on CIR, covariance, etc.). In one example, EQ preference computing component 208 can compute the preference factor for the on-time samples, $\alpha$, as $\alpha = 0.5 + s(P_1 - 0.5)$, and the preference factor for the late samples, $\beta$, as $\beta = 1 - \alpha$. In another example, EQ preference computing component 208 can compute $\alpha$ and $\beta$ based on another formula, such as:

$$\begin{bmatrix} w_1 \otimes R_{11} \otimes w_1^{mf}[0] & w_1 \otimes R_{12} \otimes w_2^{mf}[0] \\ w_2 \otimes R_{12}^{mf} \otimes w_1^{mf}[0] & w_2 \otimes R_{22} \otimes w_2^{mf}[0] \end{bmatrix} \begin{bmatrix} \alpha \\ \beta \end{bmatrix} = \begin{bmatrix} w_1^{mf} \otimes h_1^{mf}[0] \\ w_2^{mf} \otimes h_2^{mf}[0] \end{bmatrix}$$

It is to be appreciated that the on-time sampling component 204 and late sampling component 206 can apply further modifications to the samples, such as a decimation to decrease the sample rate of the samples, an operation to yield the on-time or late samples from the total received samples, and/or the like, as described.

In any case, combining component 210 can combine the equalized samples from the on-time sampling component 204 and late sampling component 206, with the preference factors applied, to generate the equalized samples. The combining component 210 can add the samples, join the samples in a vector, and/or perform other operations such that a subsequent decoder can decode data from the samples.

Where branch selecting component 202 determines to utilize the branch select functionality, for example, branch selecting component 202 can determine whether energy received over the on-time branch is greater than that received over the late branch (e.g., whether $P_1 > 0.5$). If the energy received over the on-time branch is greater than that received over the late branch, on-time sampling component 204 can be used to generate the equalized samples. If the energy received over the on-time branch is not greater than that received over the late branch, the late sampling component 206 can be used to equalize the samples. In this case, the robust features of the EQ 200 may not be used, and the EQ 200 outputs the equalized samples from the determined branch.

Figure 3:
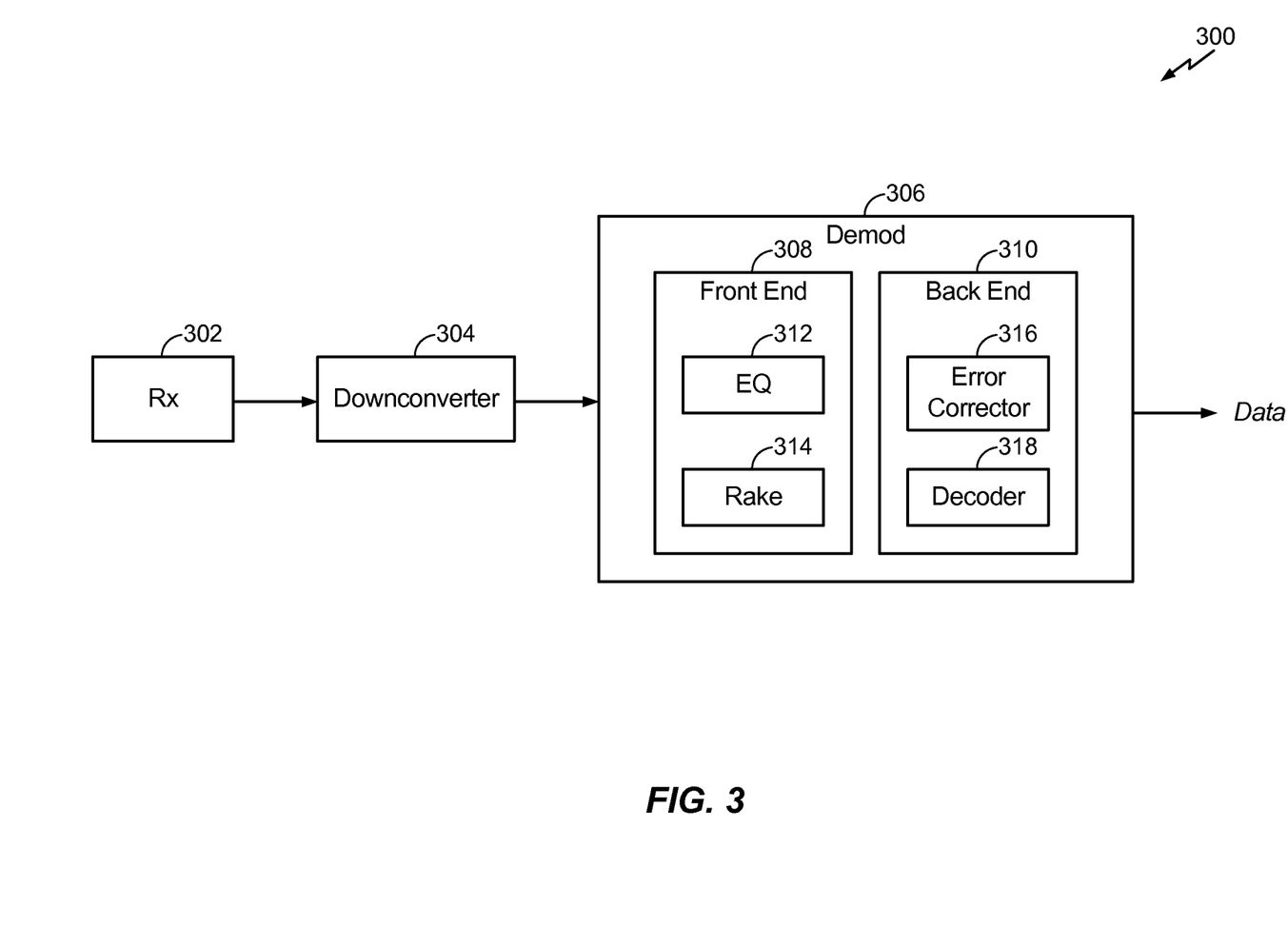
FIG. 3 shows example portion of a receiver chain comprising an EQ.

FIG. 3 depicts an example system 300 for receiving signals in a wireless communication network. System 300 includes a receiver 302 for receiving radio signals from one or more entities, a downconverter 304 for downconverting signals to allow for more reliable communication thereof, and a demodulator 306 for obtaining data from the signals. The demodulator 306 can include a front end 308 and back end 310. The front end 308 includes an EQ 312, which can be a branch select EQ, a robust FSE, and/or other EQs described herein (e.g., FSE 100, EQ 200, etc.), and/or a rake 314 to separate signals received over multiple paths and/or antennas. Back end 310 can include an error corrector 316 for repairing or removing samples received in error, and a decoder 318 for decoding data from the signals (e.g., a Viterbi, turbo, or similar decoder).

In an example, signals received by receiver 302 are downconverted by downconverter 304. The downconverted signal can be provided to the demodulator 306. EQ 312 can equalize samples of the signals, as described, and/or rake 314 can separate samples from various sources. Error corrector 316 can remove errant samples from those equalized by EQ 312, and decoder 318 can decode the data from the signals.

Figure 4:
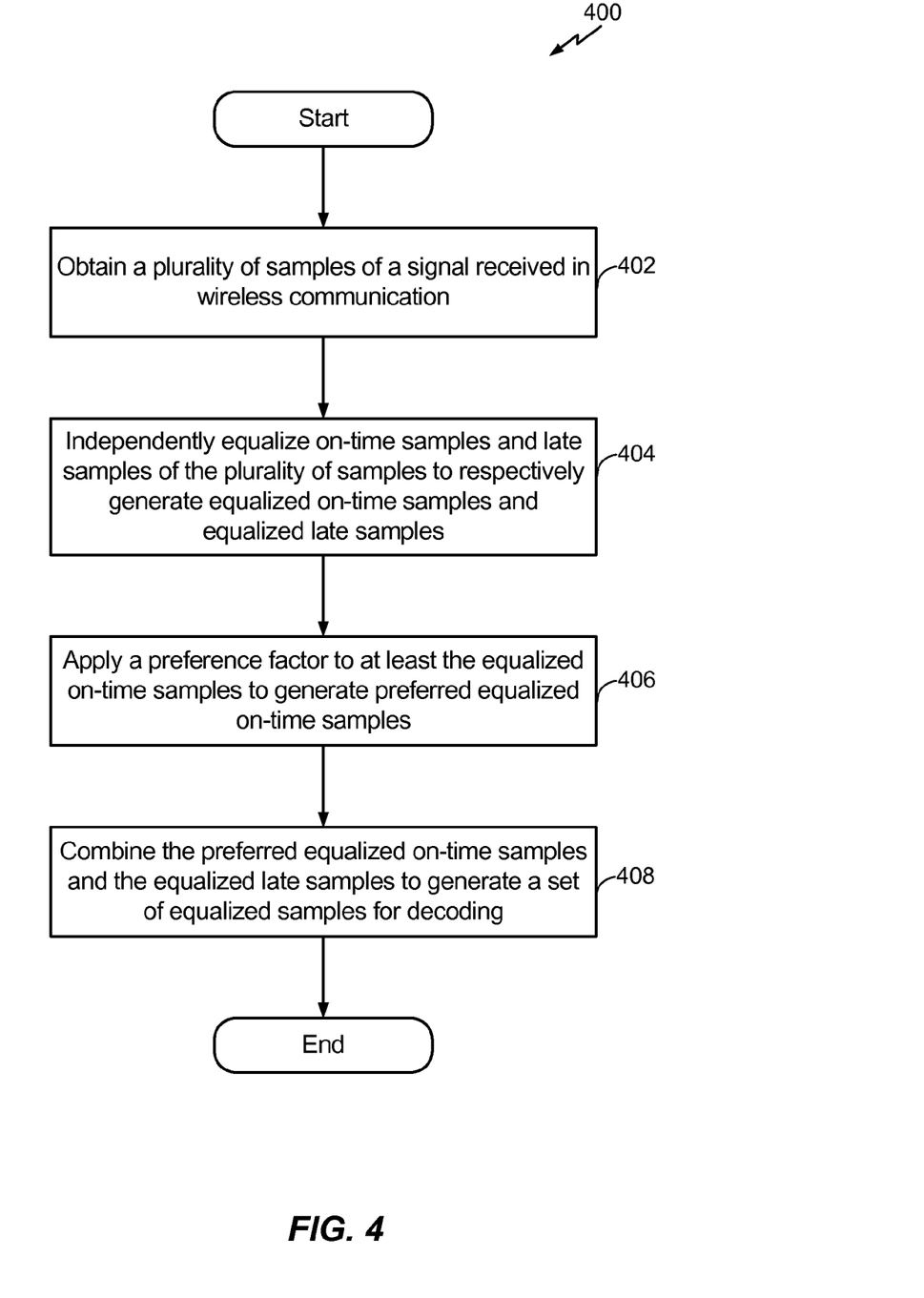
FIG. 4 is an example methodology for independently equalizing on-time and late phase samples.
Figure 5:
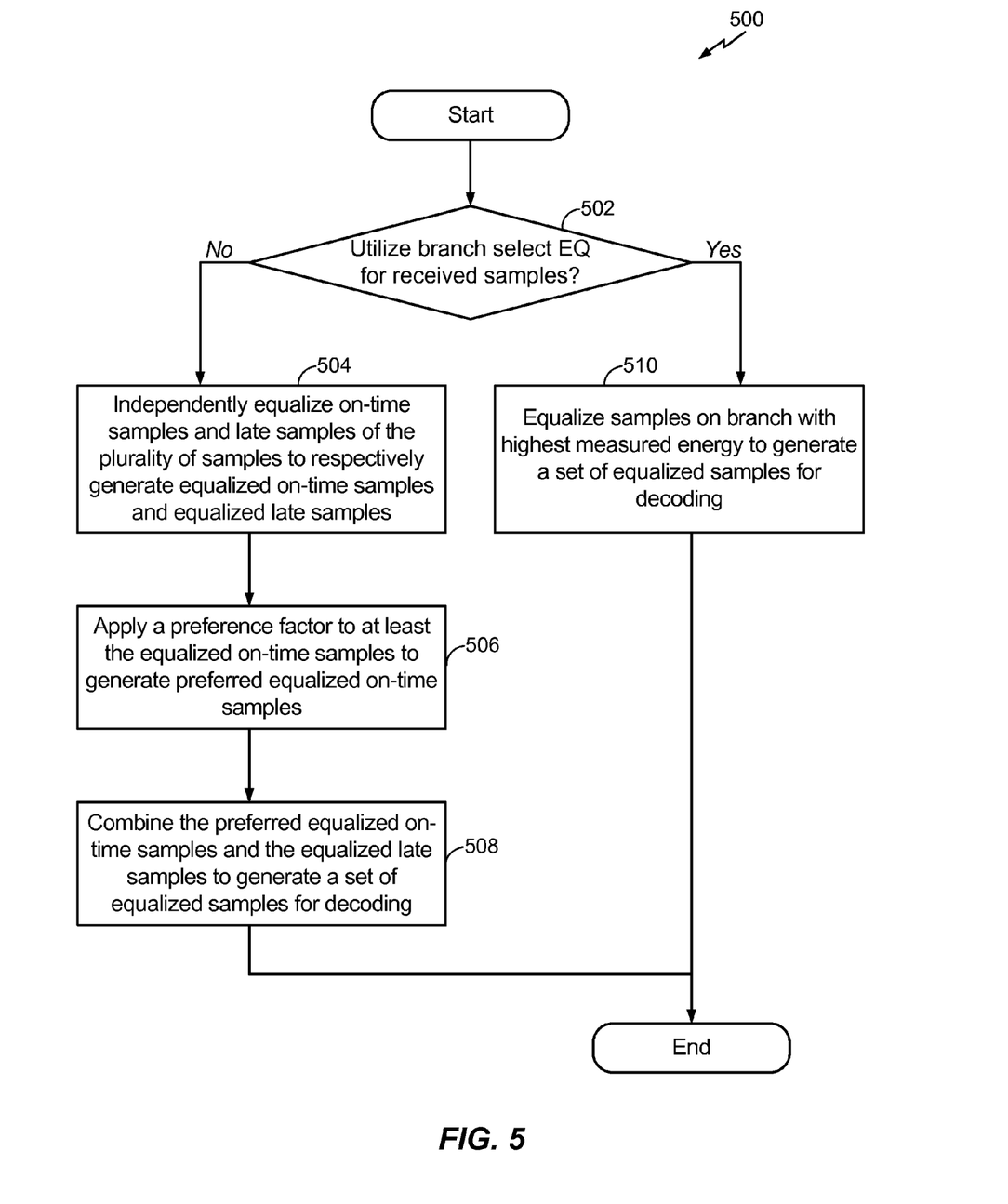
FIG. 5 is an example methodology for determining whether to employ branch select EQ or robust fractionally spaced EQ functionality.

Referring to FIGS. 4-5, example methodologies relating to equalizing samples for decoding are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 4 illustrates an example methodology 400 for equalizing samples of a received wireless signal for decoding data therefrom. At 402, a plurality of samples of a signal received in wireless communication can be obtained. For example, the signal can be obtained using a wireless receiver (e.g., a signal from a Node B or other node in a wireless communications network), as described. Moreover, the samples can include measured samples of the signal, which can have been downconverted, in one example. In addition, the samples can include on-time phase samples and late phase samples obtained from the received signal.

At 404, on-time samples and late samples of the plurality of samples are independently equalized to respectively generate equalized on-time samples and equalized late samples. Equalizing the samples can include computing a weight vector for equalizing, which can be based on respective CIR and/or covariance measured over the respective samples, as described. For example, the samples can be multiplied by weights in the weight vector.

At 406, a preference factor can be applied to at least the equalized on-time samples to generate preferred equalized on-time samples. The preference factor can also be computed based in part on the observed energy (e.g., CIR, covariance, etc.) of the on-time phase samples, the on-time weight vector, an imbalance weight, and/or the like. The preference factor can be applied by further multiplying the samples by the factor.

At 408, the preferred equalized on-time samples and the equalized late samples can be combined to generate a set of equalized samples for decoding. In addition, as described, a late preference factor can be applied to the late samples before combining. The late preference factor can be generated based on the on-time preference factor, the late branch weight factor, energy over the late and/or on-time phase samples (e.g., CIR, covariance, etc.), and/or the like.

FIG. 5 illustrates an example methodology 500 for equalizing samples of a received wireless signal for decoding data therefrom. At 502, it can be determined whether to utilize a branch select EQ for received samples. For example, this can include comparing energies (e.g., CIR, covariance, etc.) of received on-time and late phase samples, and where a difference of the energies achieves a threshold, it can be determined to utilize a branch select EQ.

If it is determined not to utilize a branch select EQ, at 504, on-time samples and late samples of the plurality of samples are independently equalized to respectively generate equalized on-time samples and equalized late samples. Equalizing the samples can include computing a weight vector for equalizing, which can be based on respective CIR and/or covariance measured over the respective samples, as described. For example, the samples can be multiplied by weights in the weight vector.

At 506, a preference factor can be applied to at least the equalized on-time samples to generate preferred equalized on-time samples. The preference factor can also be computed based in part on the observed energy of the on-time phase samples (e.g., CIR, covariance, etc.), the on-time weight vector, an imbalance threshold, and/or the like. The preference factor can be applied by further multiplying the samples by the factor.

At 508, the preferred equalized on-time samples and the equalized late samples can be combined to generate a set of equalize samples for decoding. In addition, as described, a late preference factor can be applied to the late samples before combining. The late preference factor can be generated based on the on-time preference factor, the late branch weight factor, energy over the late and/or on-time phase samples, and/or the like.

If, at 502, it is determined to utilize a branch select EQ, at 510, samples on a branch with a highest measured energy can be equalized to generate a set of equalized samples for decoding. Thus, for example, at 510, samples are generated from one of the on-time or the late branch.

Figure 6:
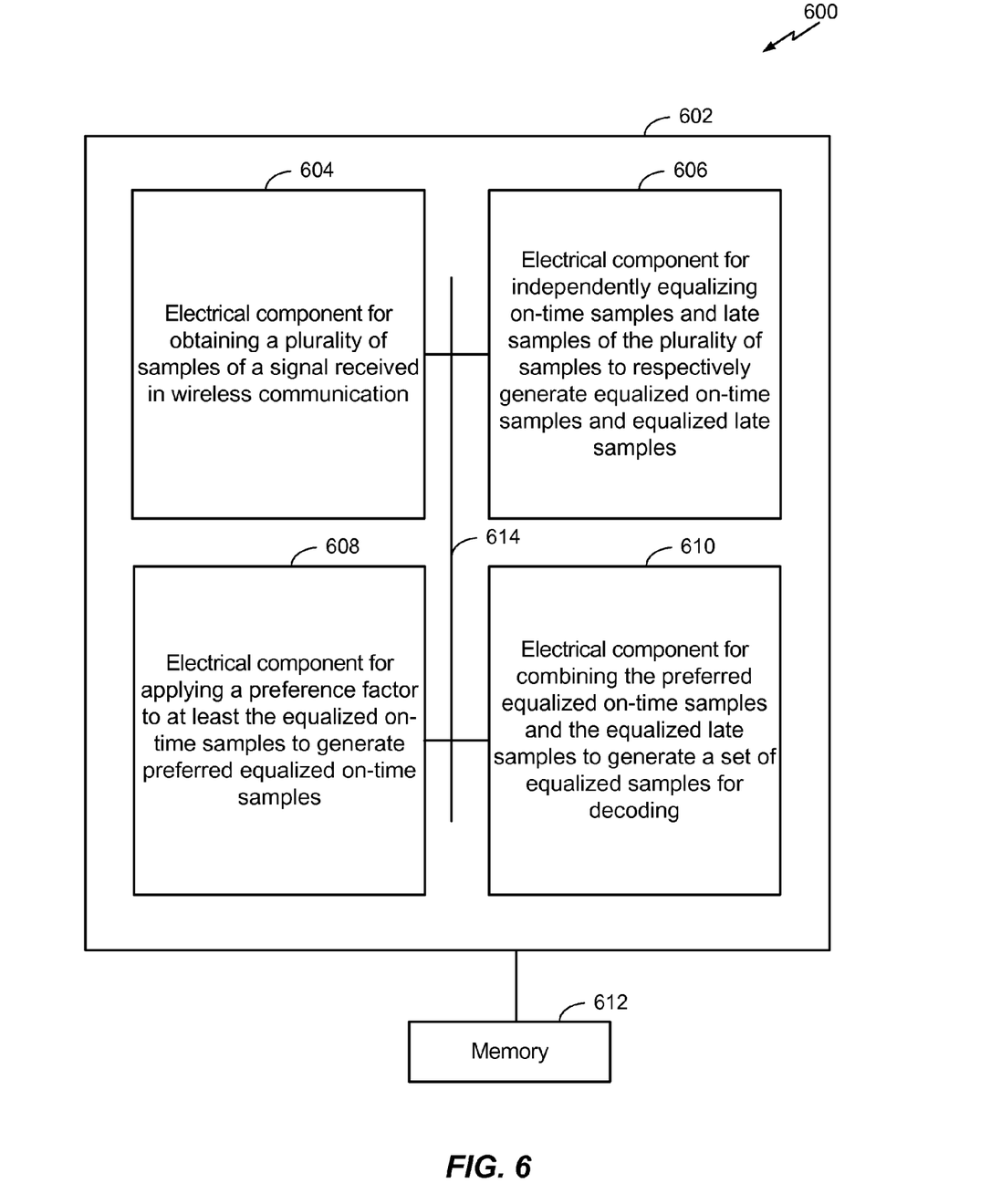
FIG. 6 is an example system that independently equalizes on-time and late phase samples.

FIG. 6 illustrates an example system 600 for generating equalized samples of a received signal for decoding. For example, system 600 can reside at least partially within a base station, mobile device, etc. It is to be appreciated that system 600 is represented as including functional blocks, which can be functional blocks that represent functions implemented by a processor, software, or combination thereof (e.g., firmware). System 600 includes a logical grouping 602 of electrical components that can act in conjunction. For instance, logical grouping 602 can include an electrical component for obtaining a plurality of samples of a signal received in wireless communication 604. As described, the signal can be received, and samples can be generated from a downconverted version of the signal. Further, logical grouping 602 can comprise an electrical component for independently equalizing on-time samples and late samples of the plurality of samples to respectively generate equalized on-time samples and equalized late samples 606. This can include equalizing the samples based on generated weight factors, as described.

Logical grouping 602 can further include an electrical component for applying a preference factor to at least the equalized on-time samples to generate preferred equalized on-time samples 608. The preference factor can be generated from energies of the samples (e.g., CIR, covariance etc.), as described. Furthermore, logical grouping 602 can include an electrical component for combining the preferred equalized on-time samples and the equalized late samples to generate a set of equalized samples for decoding 610. Moreover, for example, electrical component 604 can relate to a demodulator 306, electrical component 606 can relate to an on-time sampling component 604, late sampling component 606, etc., electrical component 608 can relate to an EQ preference computing component 608, electrical component 610 can relate to a combining component 610, and/or the like. Additionally, system 600 can include a memory 612 that retains instructions for executing functions associated with the electrical components 604, 606, 608, and 610. While shown as being external to memory 612, it is to be understood that one or more of the electrical components 604, 606, 608, and 610 can exist within memory 612. Electrical components 604, 606, 608, and 610, in an example, can be interconnected over a bus 614 or similar connection to allow communication among the components.

In one example, electrical components 604, 606, 608, and 610 can comprise at least one processor, or each electrical component 604, 606, 608, and 610 can be a corresponding module of at least one processor. Moreover, in an additional or alternative example, electrical components 604, 606, 608, and 610 can be a computer program product comprising a computer readable medium, where each electrical component 604, 606, 608, and 610 can be corresponding code.

Figure 7:
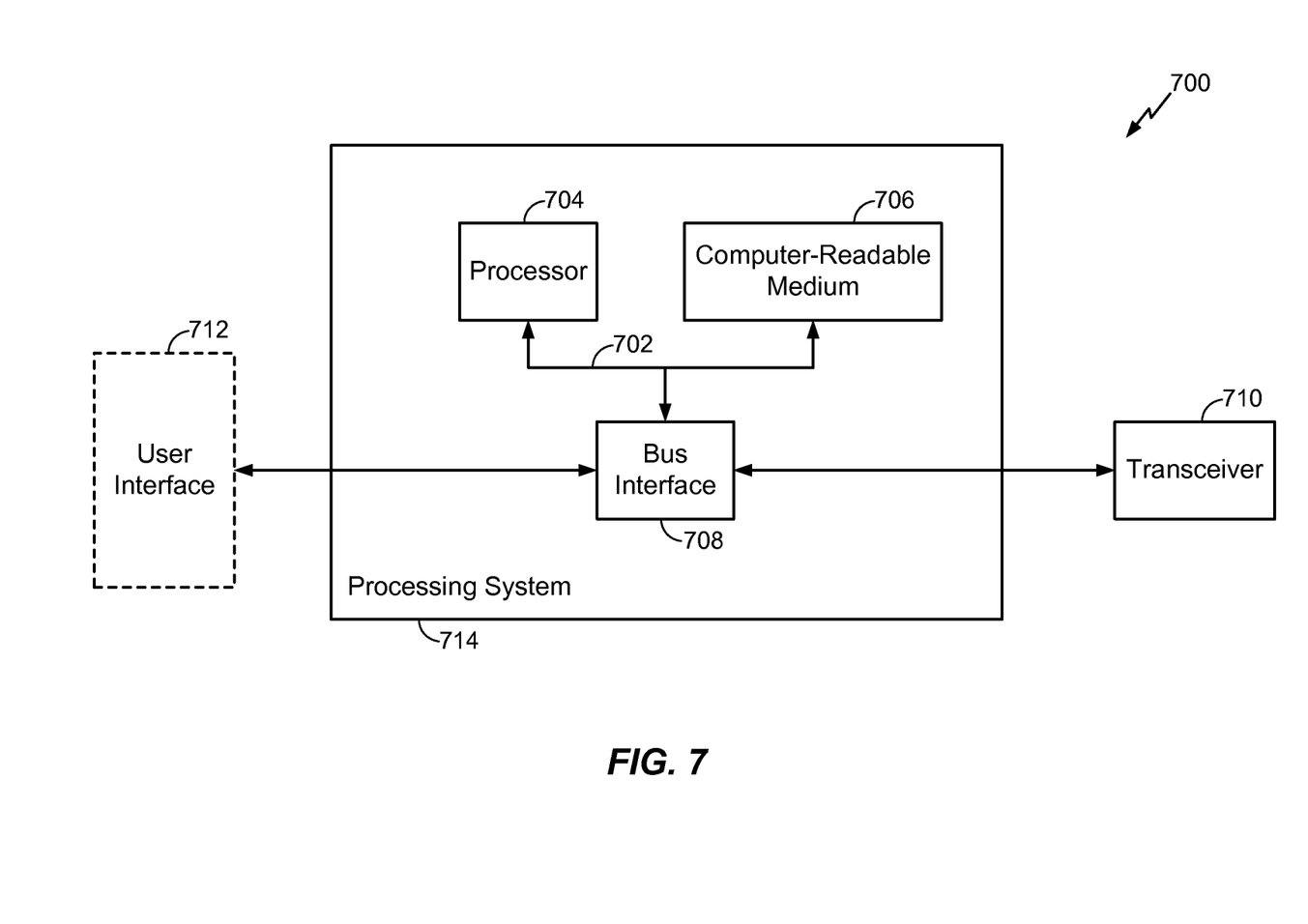
FIG. 7 is a diagram illustrating an example of a hardware implementation for an apparatus employing a processing system.

FIG. 7 is a conceptual diagram illustrating an example of a hardware implementation for an apparatus 700 employing a processing system 714. In this example, the processing system 714 may be implemented with a bus architecture, represented generally by the bus 702. The bus 702 may include any number of interconnecting buses and bridges depending on the specific application of the processing system 714 and the overall design constraints. The bus 702 links together various circuits including one or more processors, represented generally by the processor 704, and computer-readable media, represented generally by the computer-readable medium 706. The bus 702 may also link various other circuits such as timing sources, peripherals, voltage regulators, and power management circuits, which are well known in the art, and therefore, will not be described any further. A bus interface 708 provides an interface between the bus 702 and a transceiver 710. The transceiver 710 provides a means for communicating with various other apparatus over a transmission medium. For example, transceiver 710 can include an FSE 100, EQ 200, etc., as described. Depending upon the nature of the apparatus, a user interface 712 (e.g., keypad, display, speaker, microphone, joystick) may also be provided.

The processor 704 is responsible for managing the bus 702 and general processing, including the execution of software stored on the computer-readable medium 706. The software, when executed by the processor 704, causes the processing system 714 to perform the various functions described infra for any particular apparatus. The computer-readable medium 706 may also be used for storing data that is manipulated by the processor 704 when executing software.

Figure 8:
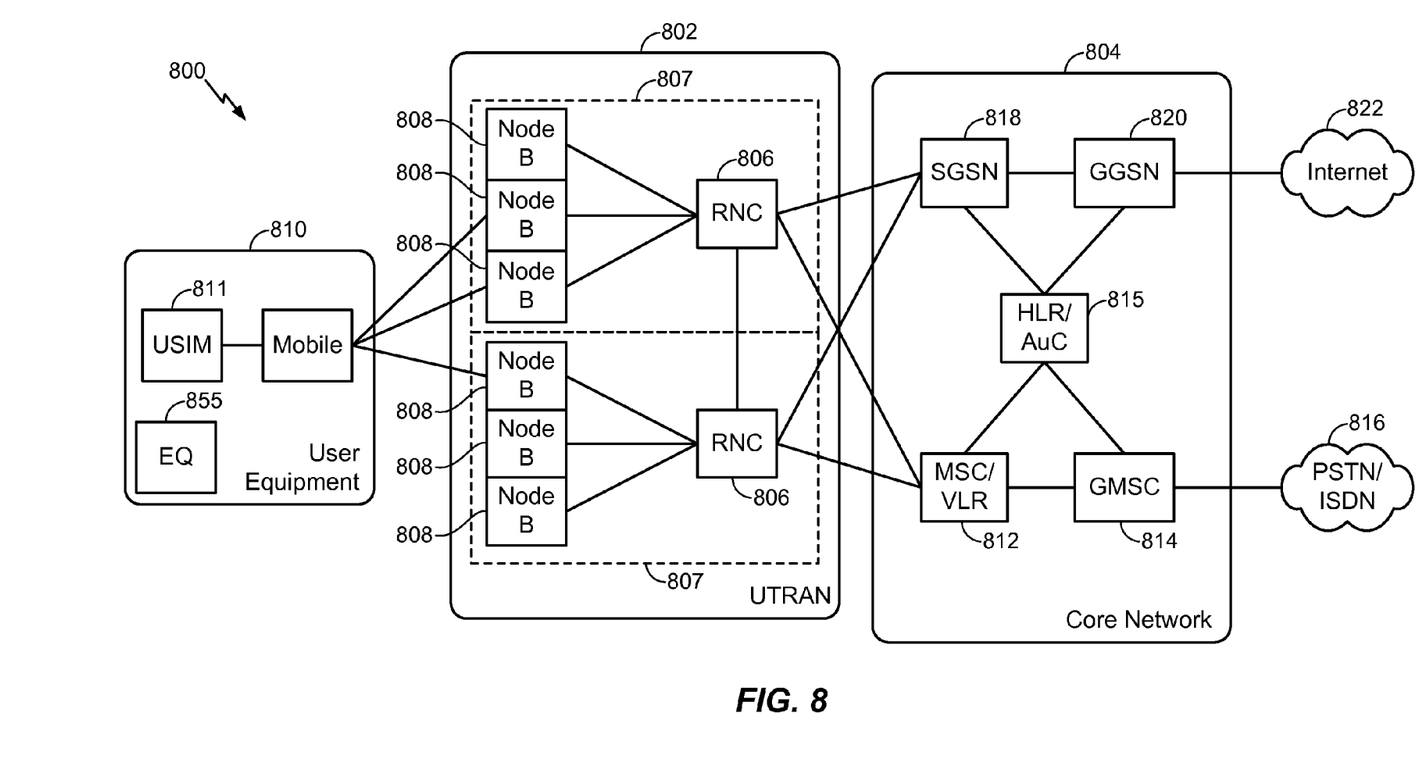
FIG. 8 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 8 are presented with reference to a UMTS system 800 employing a W-CDMA air interface. A UMTS network includes three interacting domains: a Core Network (CN) 804, a UMTS Terrestrial Radio Access Network (UTRAN) 802, and User Equipment (UE) 810. In this example, the UTRAN 802 provides various wireless services including telephony, video, data, messaging, broadcasts, and/or other services. The UTRAN 802 may include a plurality of Radio Network Subsystems (RNSs) such as an RNS 807, each controlled by a respective Radio Network Controller (RNC) such as an RNC 806. Here, the UTRAN 802 may include any number of RNCs 806 and RNSs 807 in addition to the RNCs 806 and RNSs 807 illustrated herein. The RNC 806 is an apparatus responsible for, among other things, assigning, reconfiguring, and releasing radio resources within the RNS 807. The RNC 806 may be interconnected to other RNCs (not shown) in the UTRAN 802 through various types of interfaces such as a direct physical connection, a virtual network, or the like, using any suitable transport network.

Communication between a UE 810 and a Node B 808 may be considered as including a physical (PHY) layer and a medium access control (MAC) layer. Further, communication between a UE 810 and an RNC 806 by way of a respective Node B 808 may be considered as including a radio resource control layer. In the instant specification, the PHY layer may be considered layer 1; the MAC layer may be considered layer 2; and the radio resource control layer may be considered layer 3. Information hereinbelow may utilize terminology introduced in Radio Resource Control Protocol Specification.

The geographic region covered by the SRNS 807 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), evolved Node B (eNB), or some other suitable terminology. For clarity, three Node Bs 808 are shown in each SRNS 807; however, the SRNSs 807 may include any number of wireless Node Bs. The Node Bs 808 provide wireless access points to a core network (CN) 804 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 810 may further include a universal subscriber identity module (USIM) 811, which contains a user's subscription information to a network. For illustrative purposes, one UE 810 is shown in communication with a number of the Node Bs 808. The downlink (DL), also called the forward link, refers to the communication link from a Node B 808 to a UE 810, and the uplink (UL), also called the reverse link, refers to the communication link from a UE 810 to a Node B 808.

The core network 804 interfaces with one or more access networks, such as the UTRAN 802. As shown, the core network 804 is a GSM core network. However, as those skilled in the art will recognize, the various concepts presented throughout this disclosure may be implemented in a RAN, or other suitable access network, to provide UEs with access to types of core networks other than GSM networks.

The core network 804 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 804 supports circuit-switched services with a MSC 812 and a GMSC 814. In some applications, the GMSC 814 may be referred to as a media gateway (MGW). One or more RNCs, such as the RNC 806, may be connected to the MSC 812. The MSC 812 is an apparatus that controls call setup, call routing, and UE mobility functions. The MSC 812 also includes a visitor location register (VLR) that contains subscriber-related information for the duration that a UE is in the coverage area of the MSC 812. The GMSC 814 provides a gateway through the MSC 812 for the UE to access a circuit-switched network 816. The GMSC 814 includes a home location register (HLR) 815 containing subscriber data, such as the data reflecting the details of the services to which a particular user has subscribed. The HLR is also associated with an authentication center (AuC) that contains subscriber-specific authentication data. When a call is received for a particular UE, the GMSC 814 queries the HLR 815 to determine the UE's location and forwards the call to the particular MSC serving that location.

The core network 804 also supports packet-data services with a serving GPRS support node (SGSN) 818 and a gateway GPRS support node (GGSN) 820. GPRS, which stands for General Packet Radio Service, is designed to provide packet-data services at speeds higher than those available with standard circuit-switched data services. The GGSN 820 provides a connection for the UTRAN 802 to a packet-based network 822. The packet-based network 822 may be the Internet, a private data network, or some other suitable packet-based network. The primary function of the GGSN 820 is to provide the UEs 810 with packet-based network connectivity. Data packets may be transferred between the GGSN 820 and the UEs 810 through the SGSN 818, which performs primarily the same functions in the packet-based domain as the MSC 812 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 808 and a UE 810. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

UE 810 also includes an EQ 855, which can be similar to FSE 100, EQ 200, etc., and used for equalizing samples of received signals for decoding data therefrom, as described herein.

Figure 9:
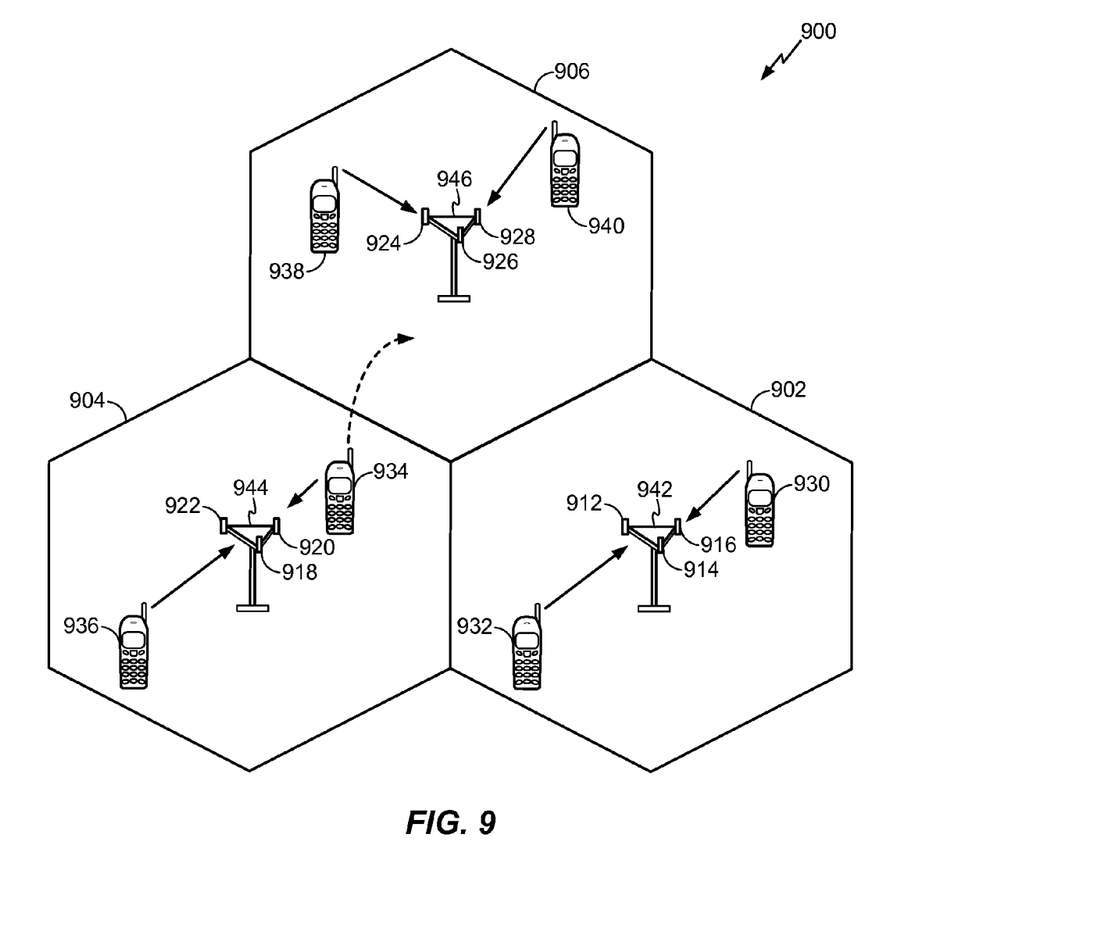
FIG. 9 is a conceptual diagram illustrating an example of an access network.

Referring to FIG. 9, an access network 900 in a UTRAN architecture is illustrated. The multiple access wireless communication system includes multiple cellular regions (cells), including cells 902, 904, and 906, each of which may include one or more sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 may include several wireless communication devices, e.g., User Equipment or UEs, which may be in communication with one or more sectors of each cell 902, 904 or 906. For example, UEs 930 and 932 may be in communication with Node B 942, UEs 934 and 936 may be in communication with Node B 944, and UEs 938 and 940 can be in communication with Node B 946. Here, each Node B 942, 944, 946 is configured to provide an access point to a core network 804 (see FIG. 8) for all the UEs 930, 932, 934, 936, 938, 940 in the respective cells 902, 904, and 906.

As the UE 934 moves from the illustrated location in cell 904 into cell 906, a serving cell change (SCC) or handover may occur in which communication with the UE 934 transitions from the cell 904, which may be referred to as the source cell, to cell 906, which may be referred to as the target cell. Management of the handover procedure may take place at the UE 934, at the Node Bs corresponding to the respective cells, at a RNC 806 (see FIG. 8), or at another suitable node in the wireless network. For example, during a call with the source cell 904, or at any other time, the UE 934 may monitor various parameters of the source cell 904 as well as various parameters of neighboring cells such as cells 906 and 902. Further, depending on the quality of these parameters, the UE 934 may maintain communication with one or more of the neighboring cells. During this time, the UE 934 may maintain an Active Set, that is, a list of cells that the UE 934 is simultaneously connected to (i.e., the UTRA cells that are currently assigning a downlink dedicated physical channel DPCH or fractional downlink dedicated physical channel F-DPCH to the UE 934 may constitute the Active Set).

The modulation and multiple access scheme employed by the access network 900 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 10:
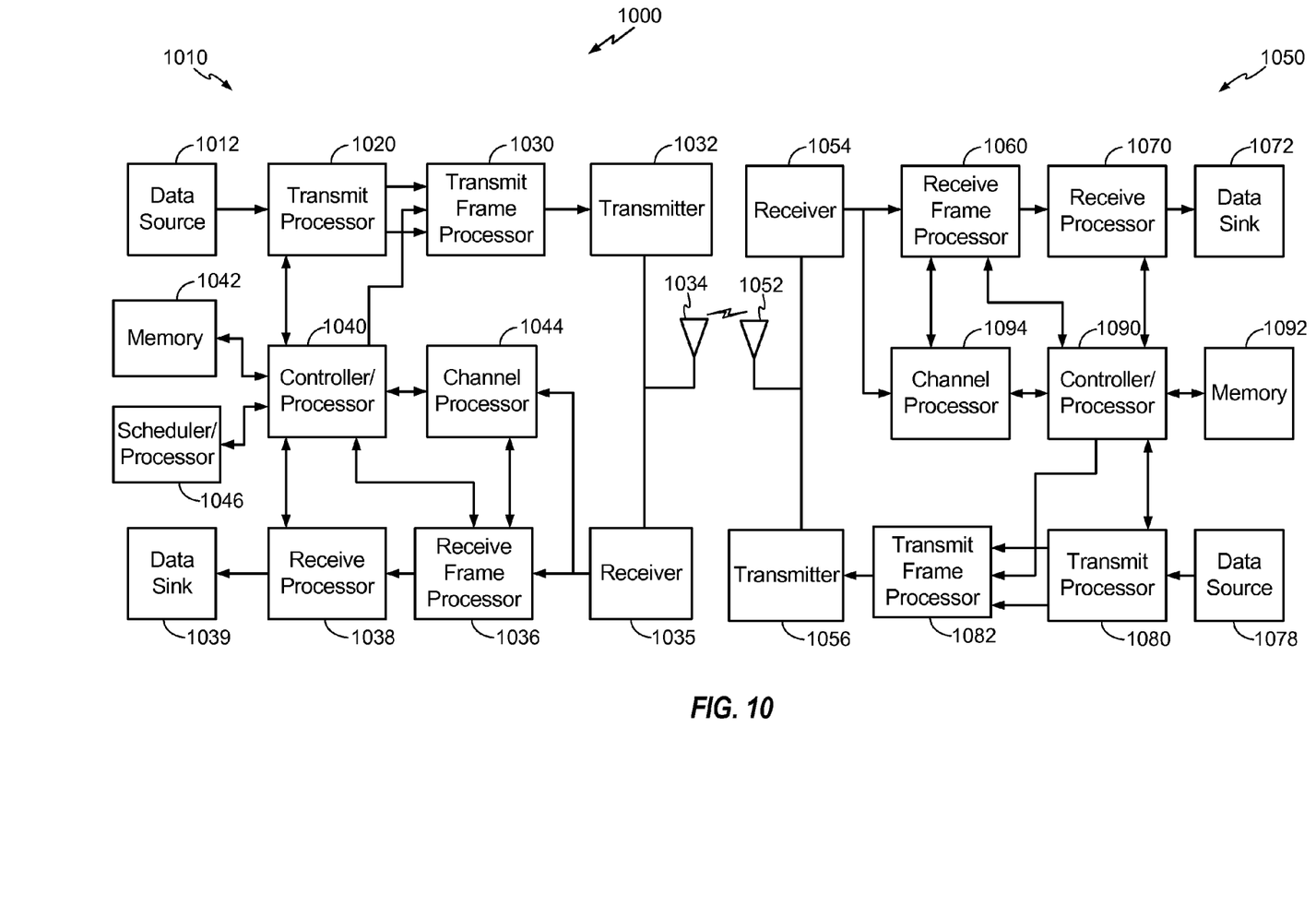
FIG. 10 is a block diagram conceptually illustrating an example of a Node B in communication with a UE in a telecommunications system.

FIG. 10 is a block diagram of a Node B 1010 in communication with a UE 1050, where the Node B 1010 may be the Node B 808 in FIG. 8, and the UE 1050 may be the UE 810 in FIG. 8. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for equalizing samples of received signals in wireless communication, comprising:
    obtaining a plurality of samples of a signal received in wireless communication;
    independently equalizing, by an equalizer, on-time samples and late samples of the plurality of samples to respectively generate equalized on-time samples and equalized late samples, wherein the independently equalizing on-time samples and late samples is based in part on comparing an on-time received energy of the on-time samples to a late received energy of the late samples, and wherein the comparing comprises respectively comparing an on-time channel impulse response (CIR) or a covariance of the on-time samples to a late CIR or a late covariance of the late samples;
    computing a preference factor for at least the on-time samples based on the covariance of the on-time samples;
    applying the preference factor to at least the equalized on-time samples to generate preferred equalized on-time samples; and
    combining the preferred equalized on-time samples and the equalized late samples to generate a set of equalized samples for decoding.

2. The method of claim 1, further comprising applying a late preference factor to at least the equalized late samples to generate preferred equalized late samples, wherein the combining comprises combining the preferred equalized on-time samples and the preferred equalized late samples.

3. The method of claim 2, wherein the late preference factor is computed based in part on the late covariance of the late samples or the preference factor.

4. The method of claim 1, wherein the preference factor is further computed based on a late covariance of the late samples.

5. An apparatus for equalizing samples of received signals in wireless communication, comprising:
   means for obtaining a plurality of samples of a signal received in wireless communication;
   means for independently equalizing on-time samples and late samples of the plurality of samples to respectively generate equalized on-time samples and equalized late samples, wherein the independently equalizing on-time samples and late samples is based in part on comparing an on-time received energy of the on-time samples to a late received energy of the late samples, and wherein the comparing comprises respectively comparing an on-time channel impulse response (CIR) or a covariance of the on-time samples to a late CIR or a late covariance of the late samples;
   means for computing a preference factor for at least the on-time samples based on the covariance of the on-time samples;
   means for applying the preference factor to at least the equalized on-time samples to generate preferred equalized on-time samples; and
   means for combining the preferred equalized on-time samples and the equalized late samples to generate a set of equalized samples for decoding.

6. The apparatus of claim 5, wherein the means for applying applies a late preference factor computed based on a late covariance of the late samples to at least the equalized late samples to generate preferred equalized late samples, and wherein the means for combining combines the preferred equalized on-time samples and the preferred equalized late samples.

7. The apparatus of claim 6, wherein the late preference factor is computed based in part on the late covariance of the late samples or the preference factor.

8. The apparatus of claim 5, wherein the preference factor is further computed based on a late covariance of the late samples.

9. A computer program product for equalizing samples of received signals in wireless communication, comprising:
   a non-transitory computer-readable medium comprising:
      code for causing at least one computer to obtain a plurality of samples of a signal received in wireless communication;
      code for causing the at least one computer to independently equalize on-time samples and late samples of the plurality of samples to respectively generate equalized on-time samples and equalized late samples, wherein the code to independently equalize on-time samples and late samples is based in part on comparing an on-time received energy of the on-time samples to a late received energy of the late samples, and wherein the comparing comprises respectively comparing an on-time channel impulse response (CIR) or a covariance of the on-time samples to a late CIR or a late covariance of the late samples;
      code for computing a preference factor for at least the on-time samples based on the covariance of the on-time samples;
      code for causing the at least one computer to apply the preference factor to at least the equalized on-time samples to generate preferred equalized on-time samples; and
      code for causing the at least one computer to combine the preferred equalized on-time samples and the equalized late samples to generate a set of equalized samples for decoding.

10. The computer program product of claim 9, wherein the computer-readable medium further comprises code for causing the at least one computer to apply a late preference factor to at least the equalized late samples to generate preferred equalized late samples, wherein the code for causing the at least one computer to combine combines the preferred equalized on-time samples and the preferred equalized late samples.

11. The computer program product of claim 10, wherein the late preference factor is computed based in part on the late covariance of the late samples or the preference factor.

12. The computer program product of claim 9, wherein the preference factor is further computed based on a late covariance of the late samples.

13. An apparatus for equalizing samples of received signals in wireless communication, comprising:
   at least one processor configured to:
      obtain a plurality of samples of a signal received in wireless communication;
      independently equalize on-time samples and late samples of the plurality of samples to respectively generate equalized on-time samples and equalized late samples, wherein the independently equalizing on-time samples and late samples is based in part on comparing an on-time received energy of the on-time samples to a late received energy of the late samples, and wherein the comparing comprises respectively comparing an on-time channel impulse response (CIR) or a covariance of the on-time samples to a late CIR or a late covariance of the late samples;
      compute a preference factor for at least the on-time samples based on the covariance of the on-time samples;
      apply the preference factor to at least the equalized on-time samples to generate preferred equalized on-time samples; and
      combine the preferred equalized on-time samples and the equalized late samples to generate a set of equalized samples for decoding; and
   a memory coupled to the at least one processor.

14. The apparatus of claim 13, wherein the at least one processor is further configured to apply a late preference factor to at least the equalized late samples to generate preferred equalized late samples, wherein the at least one processor combines the preferred equalized on-time samples and the preferred equalized late samples.

15. The apparatus of claim 14, wherein the late preference factor is computed based in part on the late covariance of the late samples or the preference factor.

16. The apparatus of claim 13, wherein the preference factor is further computed based on a late covariance of the late samples.

* * * * *